United States Patent
Tsao

(10) Patent No.: US 11,277,507 B2
(45) Date of Patent: Mar. 15, 2022

(54) DISTRIBUTED COMPUTATIONAL WEARABLE BUTTON SCREENLESS OPERATING SYSTEM AND METHOD

(71) Applicant: Julia Yu-Ching Tsao, Monterey Park, CA (US)

(72) Inventor: Julia Yu-Ching Tsao, Monterey Park, CA (US)

( * ) Notice: Subject to any disclaimer, the term of this patent is extended or adjusted under 35 U.S.C. 154(b) by 0 days.

(21) Appl. No.: 15/154,355

(22) Filed: May 13, 2016

(65) Prior Publication Data
US 2017/0331937 A1   Nov. 16, 2017

(51) Int. Cl.
| | | |
|---|---|---|
| *G06F 3/023* | (2006.01) | |
| *G06F 3/0484* | (2013.01) | |
| *H04M 1/72433* | (2021.01) | |
| *H04M 1/72469* | (2021.01) | |
| *G06F 3/16* | (2006.01) | |
| *H04M 1/60* | (2006.01) | |

(52) U.S. Cl.
CPC ...... *H04M 1/72433* (2021.01); *G06F 3/0238* (2013.01); *G06F 3/0484* (2013.01); *G06F 3/16* (2013.01); *H04M 1/72469* (2021.01); *H04M 1/6066* (2013.01)

(58) Field of Classification Search
CPC .......... H04M 1/7255; H04M 1/72583; H04M 1/6066; G06F 3/0238; G06F 3/0484; G06F 3/16
See application file for complete search history.

(56) References Cited

U.S. PATENT DOCUMENTS

| | | | | | |
|---|---|---|---|---|---|
| 4,980,910 A | * | 12/1990 | Oba | ............... | G06F 15/0283 379/354 |
| 6,035,217 A | * | 3/2000 | Kravitz | ............... | H04B 1/3833 379/355.02 |
| 6,785,387 B1 | * | 8/2004 | Albrecht | ............... | H04M 1/677 379/368 |
| 6,970,727 B1 | * | 11/2005 | Klein | ............... | H04B 1/3877 455/575.2 |
| 7,312,709 B2 | * | 12/2007 | Kingston | ............. | G08B 25/016 340/539.1 |
| 7,460,883 B1 | * | 12/2008 | McBrearty | ........ | H04M 1/72588 455/414.1 |
| 7,839,383 B2 | * | 11/2010 | Li | ............... | G06F 3/014 345/156 |
| 8,615,072 B2 | * | 12/2013 | Mahalingam | ..... | H04M 3/42382 379/102.01 |

(Continued)

OTHER PUBLICATIONS

Rachel Metz, The Button That Does Whatever You Want It to Do, Feb. 19, 2015, 7 pages.*

(Continued)

*Primary Examiner* — Yongjia Pan
(74) *Attorney, Agent, or Firm* — Ivan M. Posey, Esq.; Leech Tishman Fuscaldo & Lampl

(57) ABSTRACT

An operating system for wearable buttons comprises a master button that comprises an air interface for receiving executable instructions according to a user changeable dashboard. One or more slave buttons are configured to communicate with the master button, wherein the one or more executable instructions are configured to execute on a processor of the master button according to a user's actuation of the master button or the slave button according to the changeable dashboard.

18 Claims, 9 Drawing Sheets

(56) References Cited

U.S. PATENT DOCUMENTS

| | | | | |
|---|---|---|---|---|
| 8,903,334 B2* | 12/2014 | Lieu | ............... | H04M 1/0256 |
| | | | | 379/110.01 |
| 9,288,329 B2* | 3/2016 | Newton | ............... | H04W 4/90 |
| 9,313,622 B2* | 4/2016 | Sim | ............... | H04W 4/10 |
| 9,344,860 B2* | 5/2016 | Leroux | ............... | H04M 1/6066 |
| 9,398,126 B2* | 7/2016 | Larson | ............... | H04M 1/05 |
| 9,729,958 B2* | 8/2017 | Jaques | ............... | H04R 1/1041 |
| 2003/0078064 A1* | 4/2003 | Chan | ............... | H04W 84/08 |
| | | | | 455/514 |
| 2004/0137938 A1* | 7/2004 | Deubler, Jr. | ............... | H04L 29/06 |
| | | | | 455/550.1 |
| 2005/0064915 A1* | 3/2005 | Lair | ............... | H04M 1/6066 |
| | | | | 455/569.1 |
| 2006/0211385 A1* | 9/2006 | Kayzar | ............... | H04M 1/0202 |
| | | | | 455/90.3 |
| 2007/0143495 A1* | 6/2007 | Porat | ............... | G06Q 10/107 |
| | | | | 709/238 |
| 2007/0178950 A1* | 8/2007 | Lewis | ............... | H04B 1/385 |
| | | | | 455/575.6 |
| 2007/0225049 A1* | 9/2007 | Andrada | ............... | H04M 1/6066 |
| | | | | 455/569.1 |
| 2010/0245585 A1 | 9/2010 | Fisher et al. | | |
| 2012/0278399 A1* | 11/2012 | Turner | ............... | H04W 4/023 |
| | | | | 709/206 |
| 2013/0124186 A1 | 5/2013 | Donabedian et al. | | |
| 2013/0196633 A1* | 8/2013 | Wesby van-Swaay | ............... | |
| | | | | H04M 1/05 |
| | | | | 455/411 |
| 2013/0237281 A1* | 9/2013 | Murphy | ............... | H04M 1/0202 |
| | | | | 455/556.1 |
| 2014/0300490 A1 | 10/2014 | Kotz et al. | | |
| 2015/0286813 A1 | 10/2015 | Jakobsson | | |
| 2015/0334059 A1* | 11/2015 | Pesola | ............... | H04W 4/70 |
| | | | | 715/752 |
| 2015/0381793 A1* | 12/2015 | Cerda | ............... | H04M 1/72541 |
| | | | | 455/556.1 |
| 2016/0050547 A1* | 2/2016 | Wong | ............... | H04W 4/10 |
| | | | | 455/518 |
| 2016/0075015 A1* | 3/2016 | Izhikevich | ............... | B25J 9/163 |
| | | | | 700/253 |
| 2016/0087933 A1* | 3/2016 | Johnson | ............... | H04W 4/70 |
| | | | | 709/245 |
| 2016/0241660 A1* | 8/2016 | Nhu | ............... | H04W 4/80 |
| 2017/0060646 A1* | 3/2017 | Komulainen | ............... | G06F 1/163 |
| 2017/0192745 A1* | 7/2017 | Sunstrum | ............... | G06F 3/165 |

OTHER PUBLICATIONS

Bttn User Manual, Mar. 2015, 14 pages.*
MESH: Creative DIY Kit for the Connected Life, Aug. 18, 2015, 24 pages (Year: 2015).*
Bttn user manual, Dec. 2014, 10 pages (Year: 2014).*
V.BTTN Walkie Talkie, 2014, 5 pages (Year: 2014).*
MESH: Creative DIY Kit for the Connected Life Video, Jan. 6, 2015, 1 page (Year: 2015).*
Getting Started With Flic, Sep. 5, 2015, 10 pages (Year: 2015).*
Summery of MESH SDK, Oct. 1, 2015, 26 pages (Year: 2015).*
VSN Mobil'S "My Button Challenge", Jun. 3, 2014, 7 pages (Year: 2014).*
Chamita Fance, Bttn: Control Internet-Enabled Devices and Web Services with a Single Button—Review & Giveaway, Aug. 17, 2015, 12 pages (Year: 2015).*
Let's Get the Party Started, Oct. 3, 2014, 1 page (Year: 2014).*
Bttn—the Simplest Internet User Interface in the World, Sep. 21, 2014, 12 pages (Year: 2014).*
WunderBar by relayr, Jan. 20, 2014, 7 pages (Year: 2014).*
Getting Started with the cloudBit!, Jul. 2015, 8 pages (Year: 2015).*
WunderBar: Internet of Things Starter Kit for App Developers, Jan. 17, 2014, 1 page (Year: 2014).*
Virtual IoT | Bring Your IoT Ideas to Life with the WunderBar, Dec. 16, 2014, 1 page (Year: 2014).*
Circuit Cellar Workspaces Serious fun with IoT Relayr, Feb. 8, 2016, 1 page (Year: 2016).*
Natasha Lomas, WunderBar Is An Internet Of Things Starter Kit For App Developers, Jan. 17, 2014, 3 pages (Year: 2014).*
Tom Spendlove, WunderBar Personalized Apps for the Internet of Things, Jan. 20, 2014, 3 pages (Year: 2014).*
Simon Montford, Mesh is a DIY IOT Kit Developed by Sony That's Simple to Use, Feb. 10, 2015, 2 pages (Year: 2015).*
WunderBar by relayr, Jan. 20, 2014, 21 pages (Year: 2014).*
GitHub WunderBar, Jan. 23, 2015, 16 pages (Year: 2015).*
Tim Hornyak, Sony's goal with crowdfunding: user feedback, Feb. 10, 2015, 3 pages (Year: 2015).*
Tsao, Julia Yu Ching, Related application, Patent Cooperation Treaty No. PCT/US2017/032429, International Search Report, , dated Aug. 7, 2017.
Tsao, Julia Yu Ching, Related application, Written Opinion of the Int'l Searching Authority, PCT No. PCT/US2017/032429, dated Aug. 7, 2017.
Tsao, Julia Yu Ching, Related application, Int'l Preliminary Report on Patentability, PCT No. PCT/US2017/032429, dated Nov. 13, 2018.
Tsao, Julia Yu Ching, Related application, PCT, Transmittal of Int'l Preliminary Report on Patentability, PCT No. PCT/US2017/032429, dated Nov. 22, 2018.

* cited by examiner

DISTRIBUTED COMPUTATIONAL WEARABLE BUTTON SCREENLESS OPERATING SYSTEM AND METHOD

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention generally relates to a distributed computation, wearable button audio information-messaging system and method. More specifically, the present invention relates to a system and method that includes a screenless operating system and online dashboard for assigning procedures to fungible wearable electronic buttons.

SUMMARY OF THE INVENTION

According to one preferred embodiment, a system for wearable buttons, comprising: a master button comprises an air interface for receiving executable instructions for executing according to a user changeable dashboard; and one or more slave buttons configured to communicate with the master button; wherein the one or more executable instructions are configured to execute on a processor of the master button according to a user's actuation of the master button or the slave button according to the changeable dashboard.

According to another preferred embodiment, a method for operating wearable buttons, comprises: with a master button comprising an air interface, receiving executable instructions for executing according to a user changeable dashboard; and with one or more slave buttons, communicating with the master button; executing the one or more executable instructions on a processor of the master button according to a user's actuation of the master button or the slave button according to the changeable dashboard.

DETAILED DESCRIPTION OF THE PREFERRED EMBODIMENTS

Figure 1:
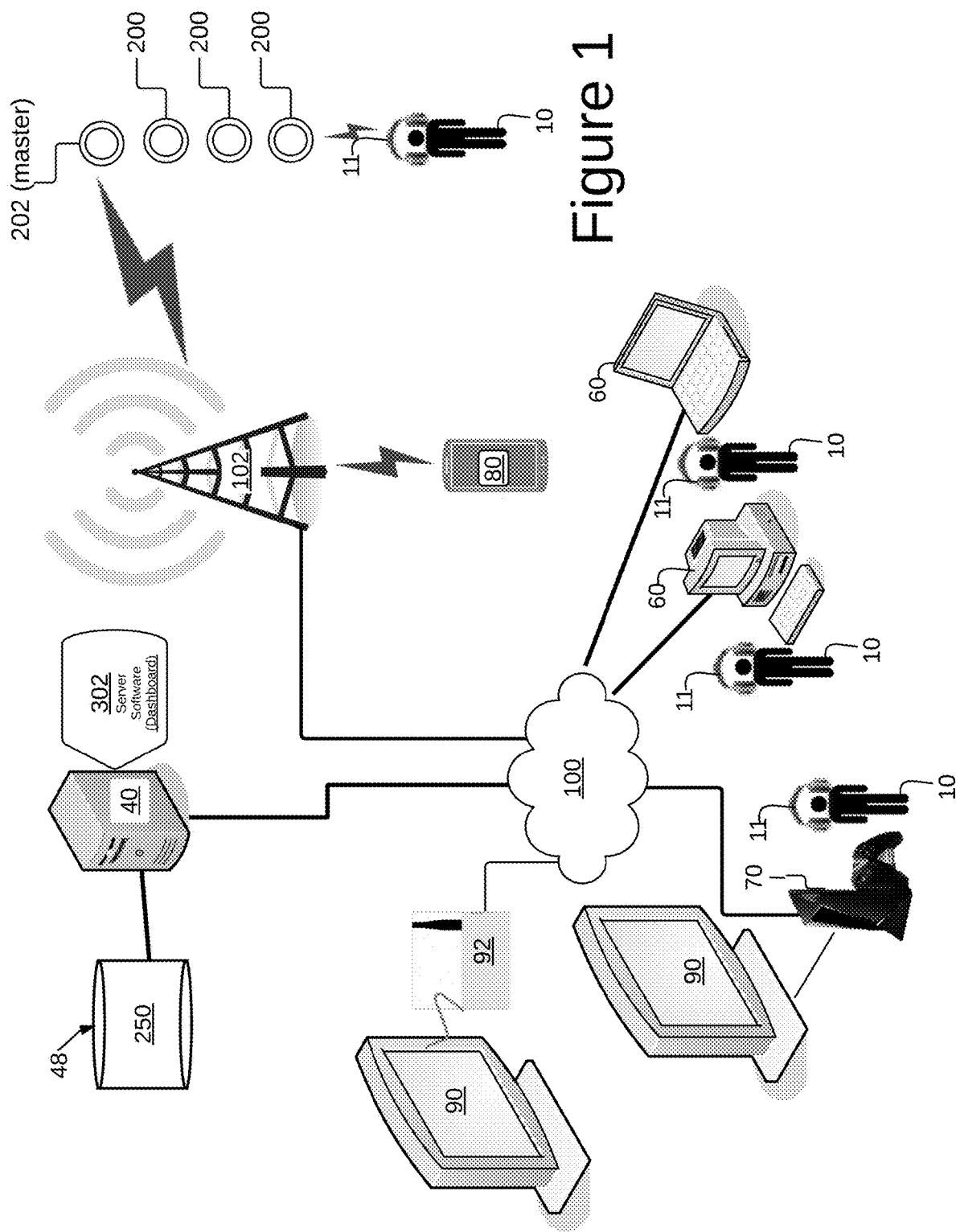
FIG. 1 is a diagrammatic representation of an exemplary internet-based environment in which one embodiment may operate.

For the purpose of illustrating the invention, there is shown in the accompanying drawings several embodiments of the invention. However, it should be understood by those of ordinary skill in the art that the invention is not limited to the precise arrangements and instrumentalities shown therein and described below.

The method and system for a distributed computation, wearable button audio information-messaging and screenless operating system is disclosed in accordance with preferred embodiments of the present invention and is illustrated in FIGS. 1-9 wherein like reference numerals are used throughout to designate like elements.

With reference to FIG. 1, a diagrammatic representation of an exemplary internet-based system is shown in which the system and method may operate according to one embodiment. As is typical on today's internet 100, users 10 may connect to and use the internet 100 over several platforms. Those platforms may include personal computers 60, mobile phones 80, tablets, or the like. Through any such platforms including but not limited to personal computers 60, mobile phones 80, tablets, or the link, users may access a dashboard website run by the server 40 to assign functionality to buttons 202, 200. One of the latest ways to connect to the internet includes using internet protocol television, or IPTV, boxes 92. These IPTV boxes 92 include a wireless or wired device that has a memory and storage for applications or apps that connects to the internet 100. Through an IPTV box 92, users may access a dashboard website run by the server 40 to assign functionality to buttons 202, 200. The television is typically connected to the IPTV box 92 via an HDMI cord, component cable, or audio/video (A/V) input lines.

Further, modern game consoles 70 are now capable of internet browsing and input. Game consoles 70 such as XBOX®, Playstation®, Nintendo®, Wii®, and others, provide for internet browsing. Just as with the platforms described above, game consoles 70 typically connect to a TV 90 on websites such as the dashboard described herein can be accessed. With any one of these devices, or just a simple cell phone 80, users may access a dashboard website run by the server 40 to assign functionality to buttons 202, 200

One or more servers 40 may include one or more storage devices 48 containing one or more databases 250.

Users 10 can use headphones or a headset 11 as part of the wearable audio information-messaging system and screenless operating system, which may connect to the master wearable button 202 via Bluetooth® technology. In this respect, the buttons may comprise two varieties: a master 202 button, and one or more slave buttons 200 for the user 10 to use with the headphones 11. In one embodiment, by way of example and not by way of limitation, the wearable slave buttons 200 may or may not include Bluetooth® capable buttons, such as the V.BTTN® available from VSN Mobil, Inc. of Fort Lauderdale, Fla., or the Curie™ available from the Intel Corporation of Santa Clara, Calif. However, the master button 202 may comprise a processor and transceiver capable of communicating over 2G, 3G, 4G, and by Bluetooth® or near frequency technology (NFT) with the slave buttons.

Figure 2:
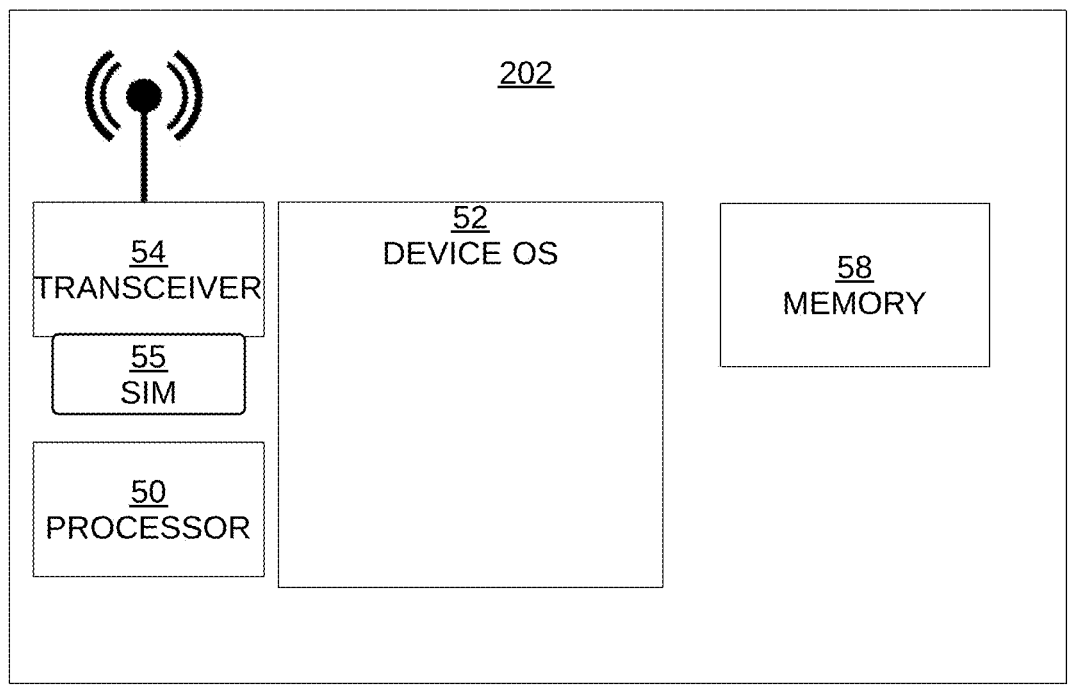
FIG. 2 is a diagrammatic representation of the electronic components of one or more master buttons according to the embodiment of FIG. 1.

With reference to FIG. 2 a diagrammatic representation of the internal components of an exemplary master button 202 is shown. As those skilled in the art would recognize, each master button 202 may include a processor 50, on which executable instructions of an app or computer program 202 may execute to selectively communicate with the slave buttons 200. As those skilled in the art would recognize, one or more computer programs may be loaded by an operating system 52 running on the master button processor 202 to receive and forward, for example, audio information-messages, to receive and forward button push instructions, or other data from each of the slave buttons 200 and headset device 11. A chip set and electronics comprises a transceiver 54 for communicating over one or more wireless networks, including 2G, 3G, 4G, Wimax, 5G or other wireless networks so that data may be sent and received over the internet 100. Each master button 202 may further include a subscriber identification module (SIM) 55 for identifying the master button 202 on the wireless air interface.

Figure 3:
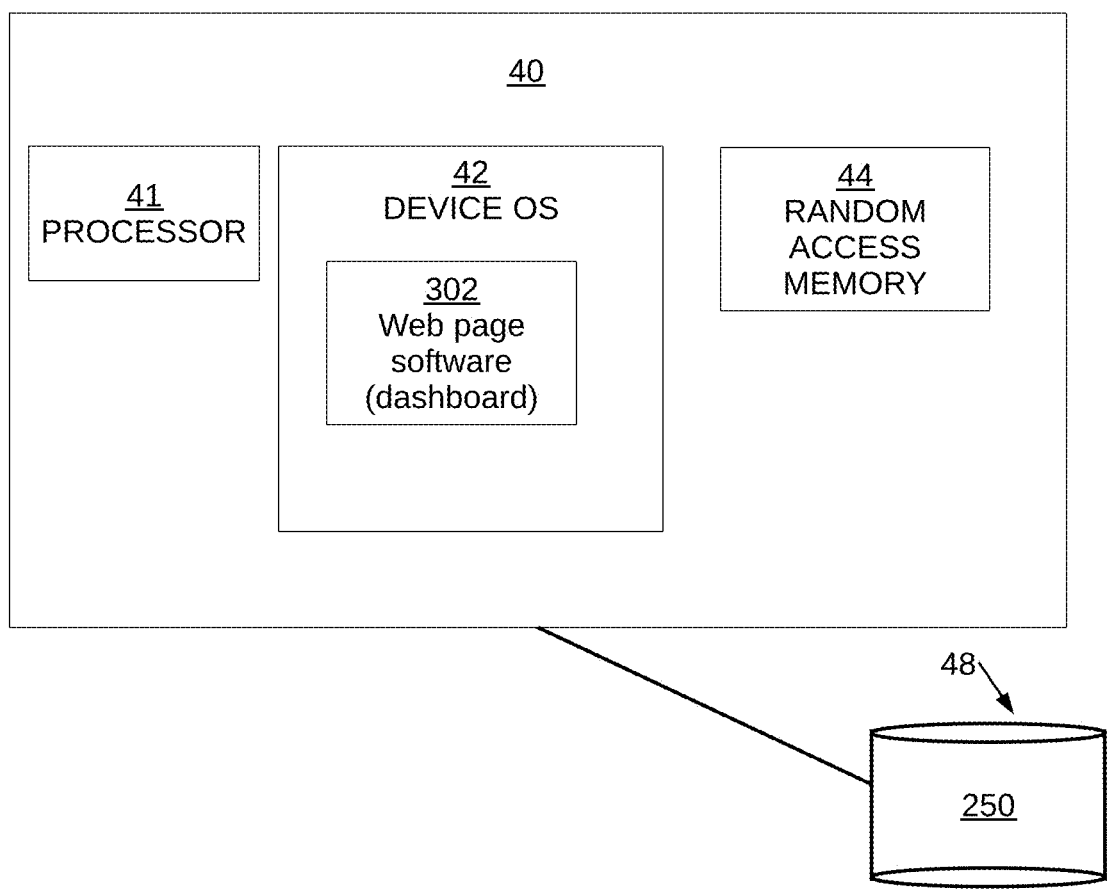
FIG. 3 is a diagrammatic representation of components one or more of the server devices of FIGS. 1 and 2.

With reference to FIG. 3, a diagrammatic representation of the one or more servers 40 and storage device 48 with a database 250 is shown. As those skilled in the art would recognize, one or more computer programs may be loaded by an operating system 42 running on the server processor 41. One of the computer programs may comprise a user dashboard program 302 for presenting to the users 10. The server 40 may have a random access memory (RAM) 44 that may be used for loading programs, and storing program variable data.

Figure 4:
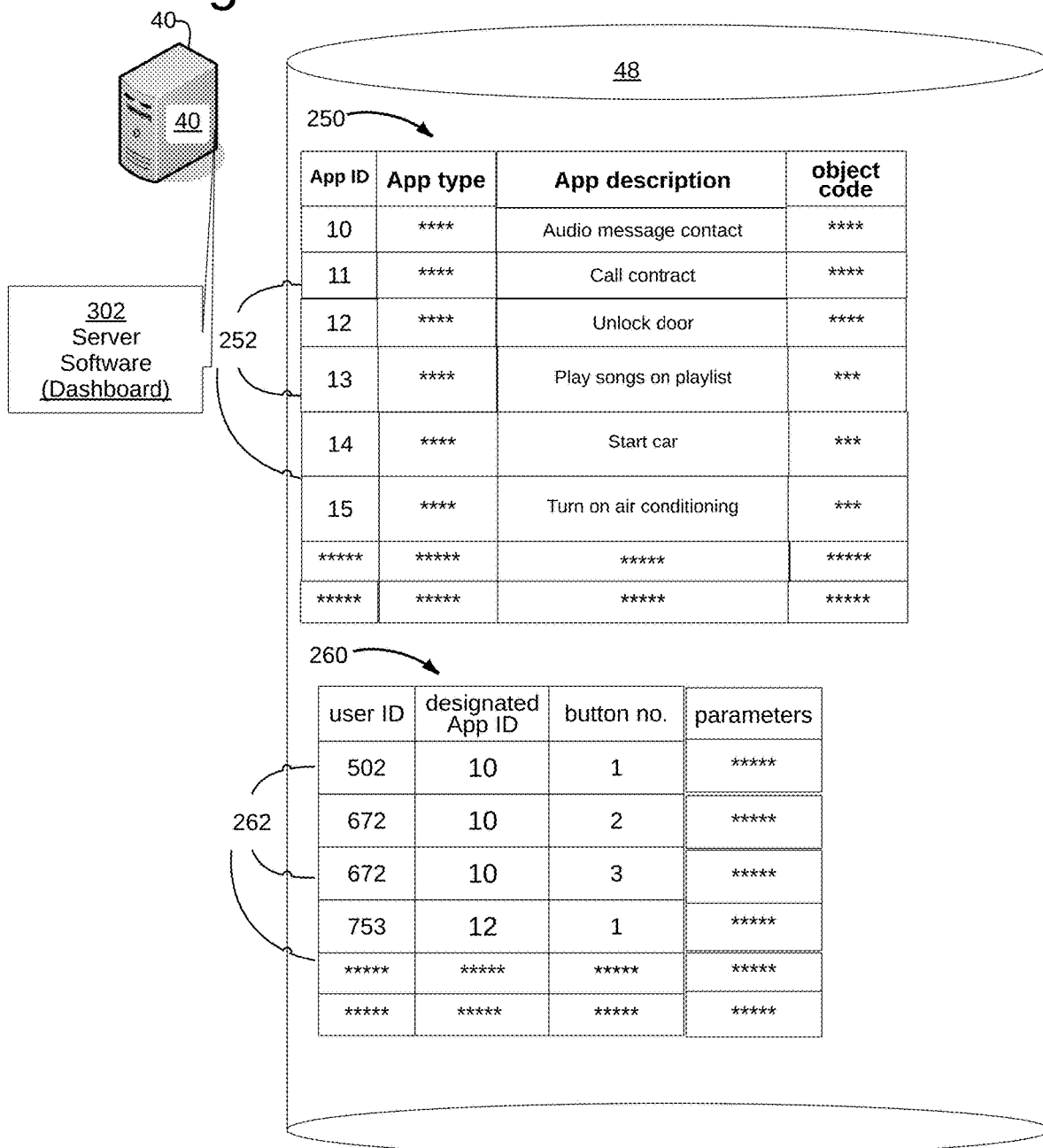
FIG. 4 is a more detailed diagrammatic representation of the server and storage device with a database containing electronic data that is transformed according to FIGS. 1-3.

With reference to FIG. 4, a more detailed diagrammatic representation of the storage device with a database containing electronic data that is transformed according to FIGS. 1-3 is shown. The server or dashboard software 302 contains sets of instructions executing on the server 40 for transforming the data in the database 250 on storage device 48 for assigning and executing procedures for the buttons 200, 202. In one embodiment, the database 250 may contain one or more available server app tables with records 252 that a user 10 may assign one or more of their buttons 202, 200. Fields in record 252 may comprise, for example, a sever app ID, an app type field, an app description field, and the object code for executing the app.

Another user button assignment table 260 may contain user records that store which of the server apps selected from table 250 via the dashboard 302 by the user 10 to execute when a button is pressed. Each record 260 may store the user ID, the designated app ID selected, and the button to which the app is assigned. Further, any parameters that are needed are stored in another field. Such parameters may include, for example, the unique subscriber identification module (SIM) number or carrier-assigned number for the master button 202 for exchanging audio or text messages between users 10.

Figure 5:
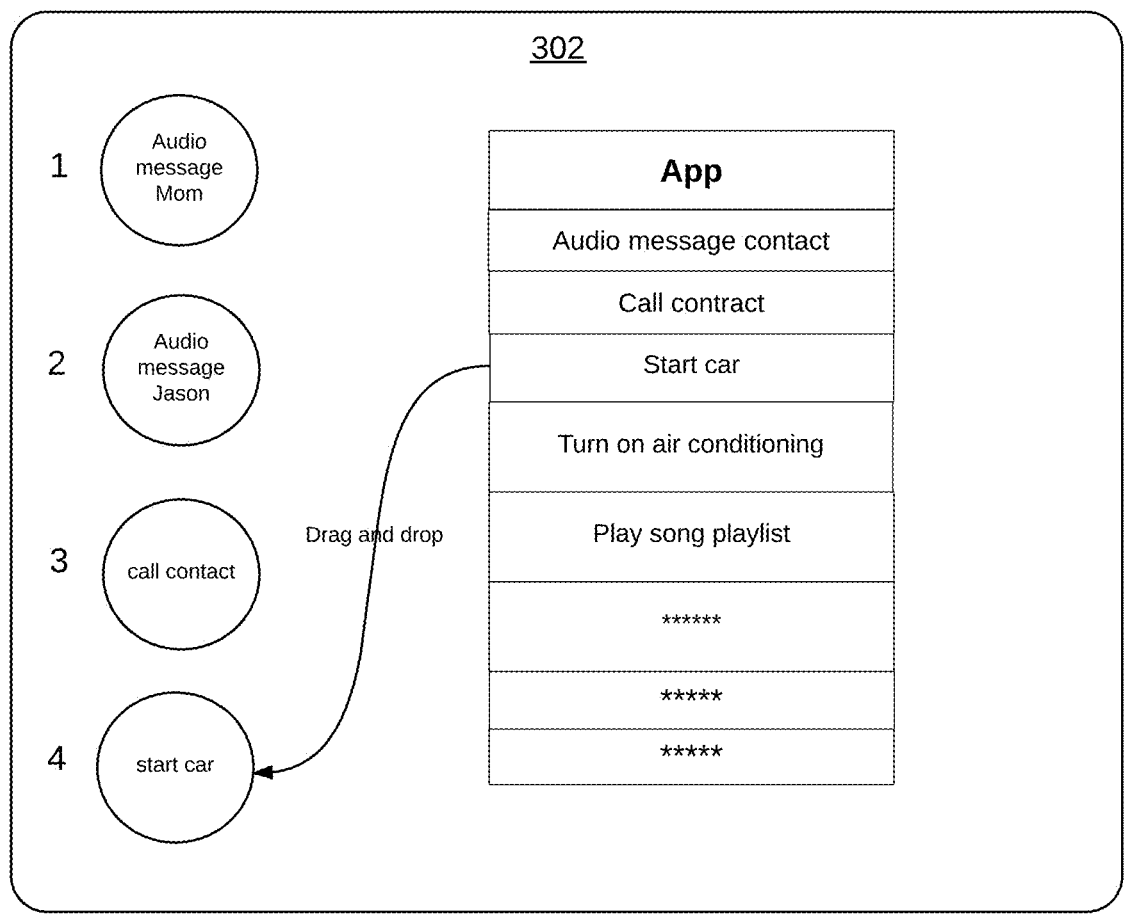
FIG. 5 is an exemplary screen shot of the server dashboard software according to the embodiment of FIGS. 1-4.

With reference to FIG. 5, an exemplary screen shot of the server dashboard software 302 is shown. As stated above, a user 10 may access the dashboard 302 through any number of devices, including but not limited to the personal computers 60, mobile phones 80, tablets, IPTV boxes 92, game consoles 70, or any hypertext protocol mark-up language (HTML) capable device. Java or flash implementations may further allow for drag and drop capability. For example, an available application may be assigned to each user button 202, 200 by a drag and drop method, or click and click again method, or right-click left-click method on screen while in the dashboard 302. After a user logs into the dashboard 302, user will have the ability to add buttons to the system, as well as access all of the previously registered buttons. User registered buttons may appear on one side and the available applications may be viewed on the other, as shown in FIG. 5. Such an interface may make it easy to assign server applications to wearable buttons 202, 200. The dashboard software 302 reads the available applications to be assigned to each button from database 250 (FIG. 4). As the user 10 drags, drops, and configures each of their buttons 202, 200, then the user database 260 (FIG. 4) is updated to reflect the selections and configurations. Those configurations that require parameters (such as the phone number of another user), then pop-up boxes may appear as the user drags and drops applications to buttons in the dashboard software 302.

It should be noted that, in one embodiment, there is no need to download any software or applications to the user's buttons 202, 200. This simplifies the hardware needed in the buttons 202, 200 themselves, leaving the majority of processing to be performed on the server.

Figure 6:
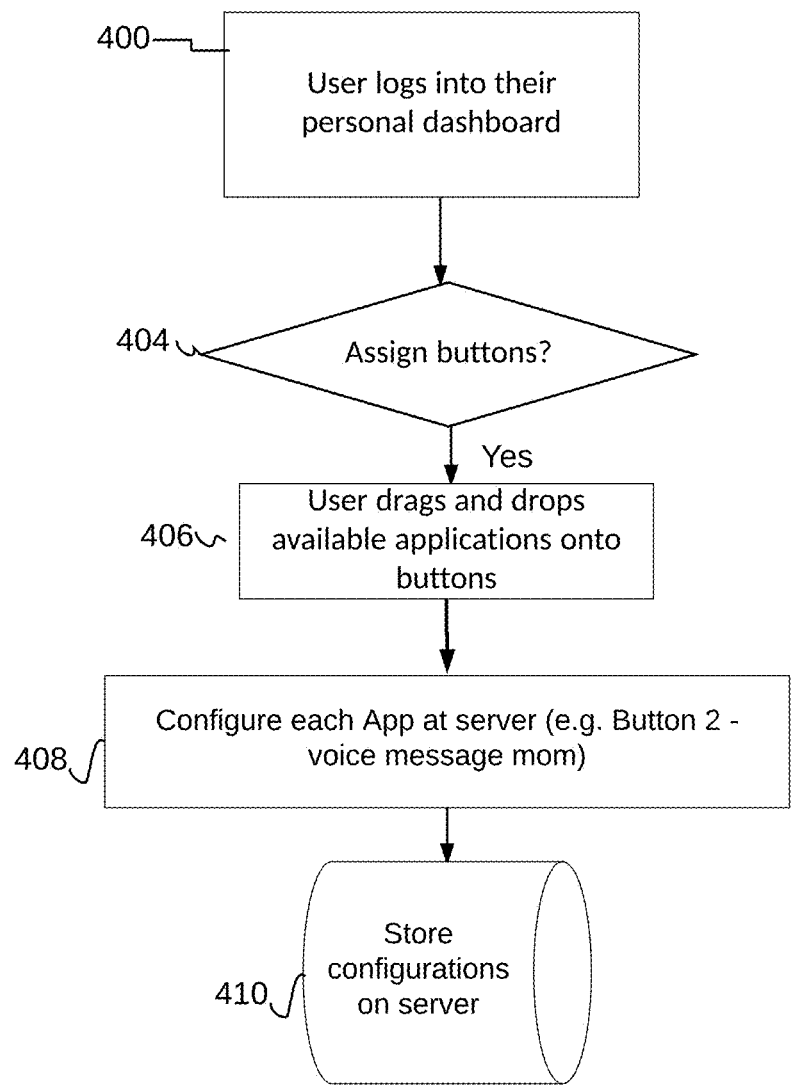
FIG. 6 is a flow diagram that illustrates steps performed for assigning buttons to server applications according to the embodiments of FIGS. 1-5.

With reference to FIG. 6, a flow diagram illustrates steps performed for assigning buttons to server applications according to one embodiment. In step 400, the user 10 may log into their personal dashboard. If the user 10 choses to assign buttons, step 404, then the user may drag and drop the application onto the button in the server dashboard software 302 (FIG. 5), step 406. In step 408, the user may configure each assigned application as needed. For example, if the application is a direct user-to-user audio message application, then the user 10 may be required to type in the user account ID or number corresponding to the SIM 55 of the master button 202 of the other user 10 for audio messaging (e.g. mother's or friend's number). In step 410, the selections are stored in databases 250 and 260.

Figure 7:
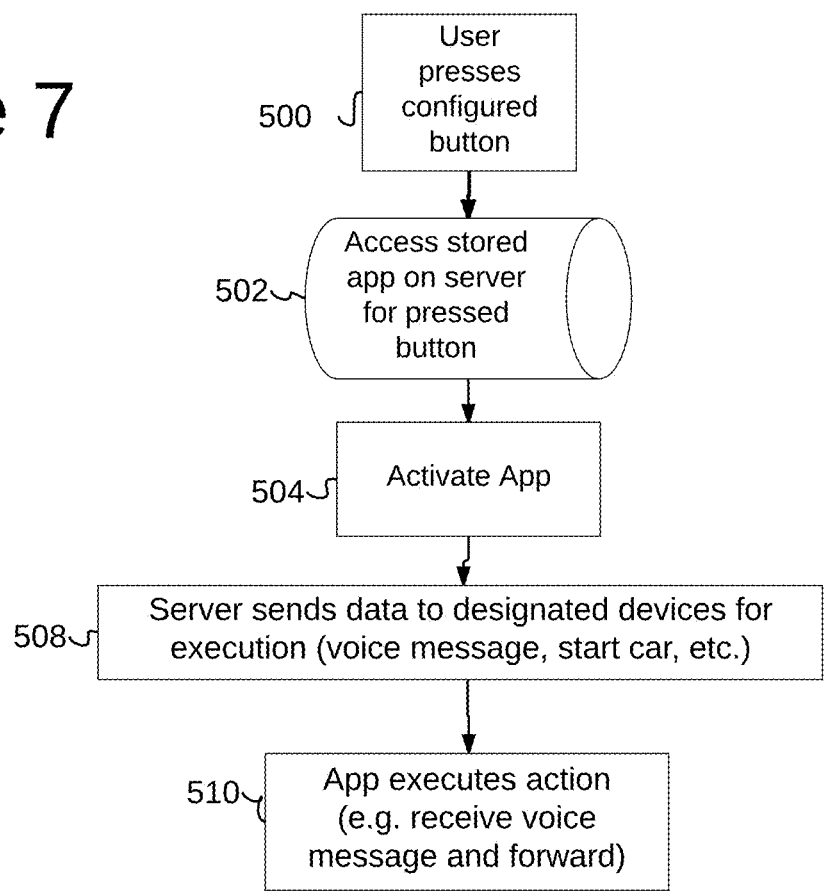
FIG. 7 is a flow diagram that illustrates the steps performed in one embodiment when a user presses one of the buttons according to the embodiments of FIGS. 1-6.

With reference to FIG. 7, a flow diagram illustrates the steps performed in one embodiment when a user 10 presses one of the buttons 202, 200. In step 500, the user presses one of the configured buttons 202, 200. In step 502, the master button 202 that was pressed receives a signal from the pressed button (202 or 200), and forwards the number of the button 202, 200 that was pressed to the server 40 through the cellular connection, wherein the server accesses the stored application for the button 202, 200 that was pressed by the user 10 out of database 260. In step 504, the server 40 activates the selected application, after which, in step 508, the server 40 sends data to the designated devices to activate execution. In step 510, the application executes, including receiving any audio information-messages to forward from the user's master button 202 after reception from the user's headset 11.

Figure 8:
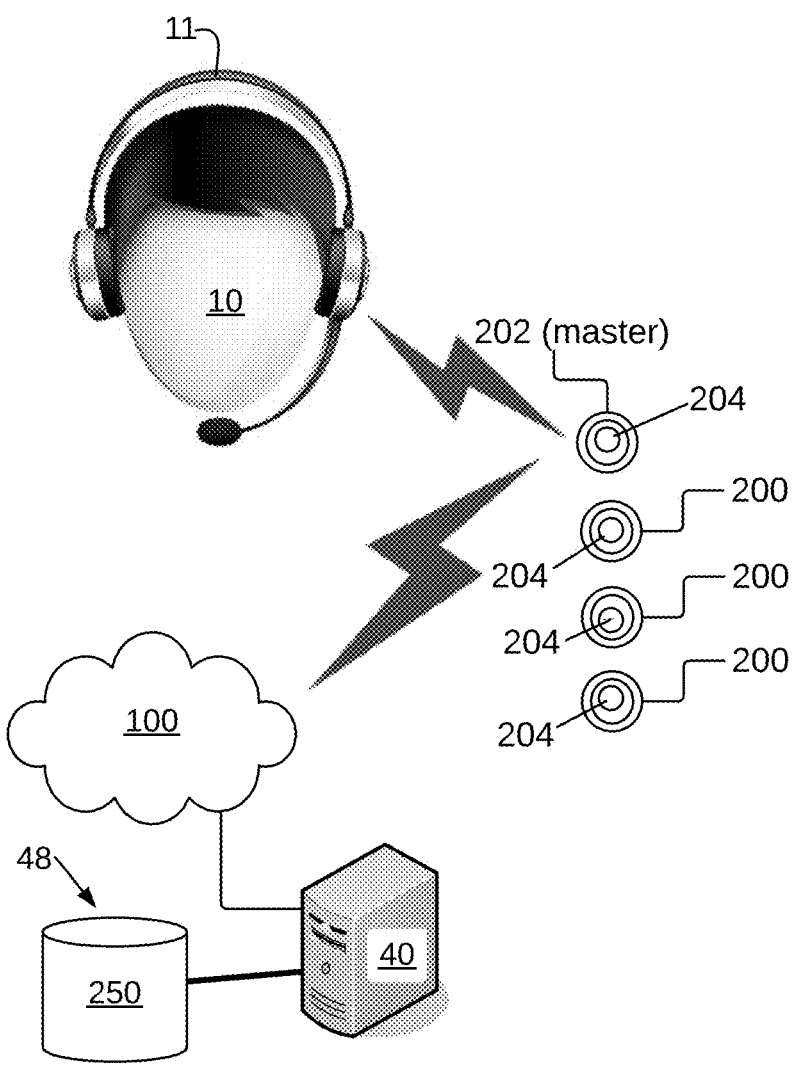
FIG. 8 is a diagrammatic representation of parts of the system showing the master-slave button relationship according to the embodiments of FIGS. 1-7.

With reference to FIG. 8, a diagrammatic representation of parts of the system showing the master-slave button relationship according to the embodiments of FIGS. 1-7 is shown. As described above, users 10 may use headphones or a headset 11, which may connect to the master wearable button 202 via Bluetooth® technology. In this respect, the buttons may comprise two varieties: a master 202 button, and one or more slave buttons 200 for the user 10 to use with the headphones 11. When the user 10 presses one of the master button 202 (for example, which may be designated button number 1), then the master button 202 may then send a signal through the wireless air-interface to the server 40 to the dashboard software 302 to indicate that button 1 has been pressed for execution of the appropriate application assigned by the user for button 1.

However, in the case where one of the slave buttons 200 has been pressed (e.g. designated button 2), then the slave button 200 provides a signal to the master button 202 that it has been pressed. The master button operating system 52 may then forward a signal to the server 40 that button 2 has been pressed for the user 10 wearing the button, where the dashboard software 302 may then execute the appropriate application for the pressed slave button 200.

Figure 9:
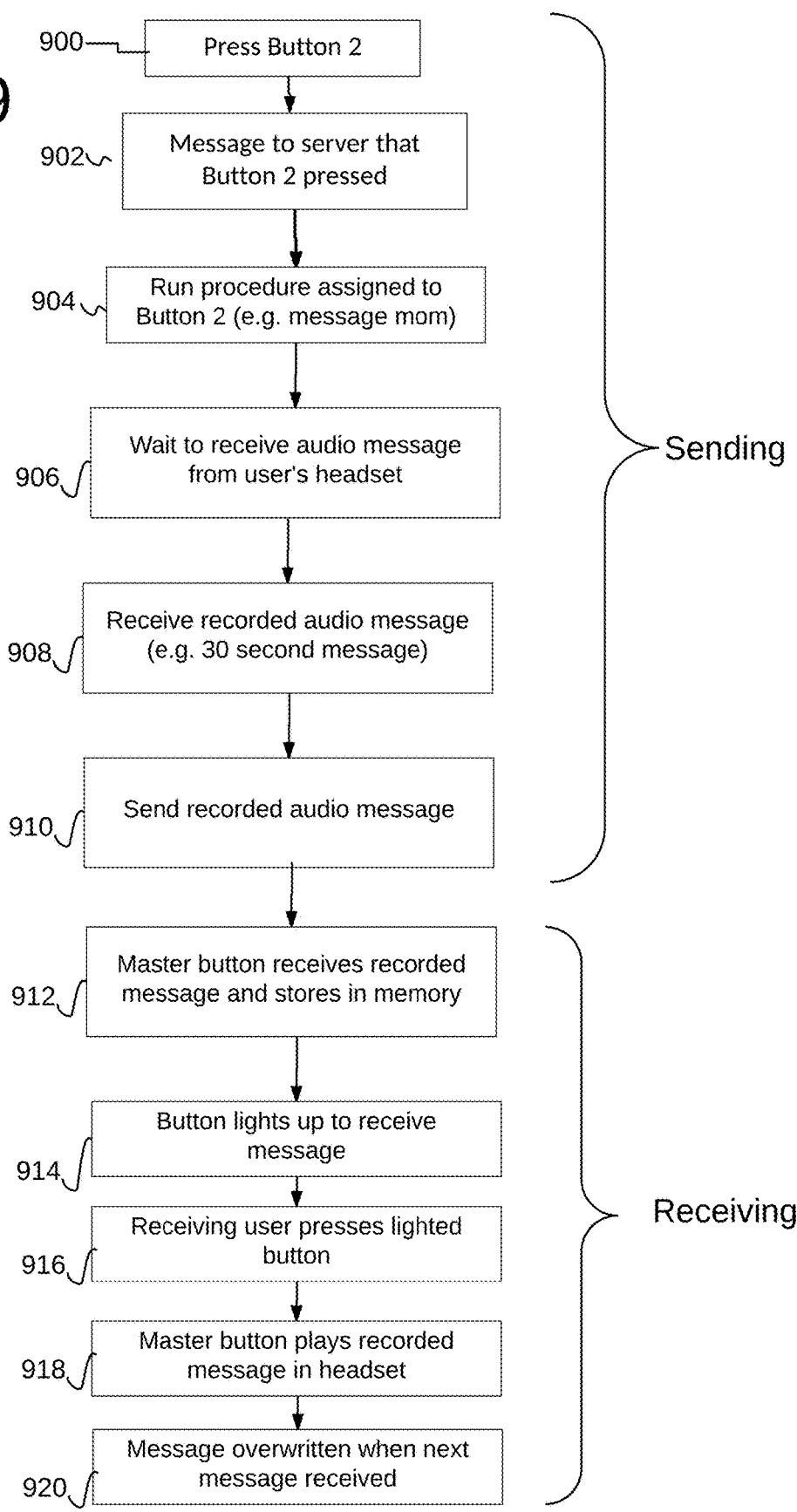
FIG. 9 is a flow diagram showing the steps performed in an example implementation of an application assigned on the server for audio messaging.

With reference to FIG. 9, a flow diagram illustrates the steps performed in an example implementation of an application assigned on the server for audio information-messaging. In this example, a slave button 200 designated as button 2 is pressed by the user, step 900. Through the master button 202 as described above, a signal is sent to the server that button 2 was pressed, step 902. In step 904, the server may run the application or procedure may run the procedure assigned by the user 10 to button 2. In this case, if button 2 was assigned to audio message mom, then the dashboard software 302 may wait to receive an audio message from the user's headset 11 through the master button 202, step 908. In step 910, the recorded message is received by the server and sent to the master button 202 according to the parameters in database 260 (e.g. mom's user account ID or SIM or number) and is stored in the memory 58 of the master button 202.

In step 912, the master button 202 of the recipient receives and stores the audio message. In one embodiment, each of the buttons 200 have a light, such as a light-emitting diode (LED) 204 for indicating that a message has been received. In one embodiment, in order for the recipient user 10 to receive a message from another user 10, the recipient user 10 must have also configured a button 202, 200 on their dashboard 302 to communicate with the user 10 sending the message. In this respect, the master button 202 for the recipient user 10 processes the received message and sends a signal to the button 202 or 200 to light the corresponding LED (204 in FIG. 8) to indicate to the recipient user that a message has been received, step 914. In step 916, the recipient user 10 may then press the button 202, 200 with the LED 204 lit. In step 918, the master button 202 reads the audio information-message out of memory 58 and plays the message on the headset 11 of the recipient user 10. In step 920, once having undergone playback, this audio information-message is replaced when a new audio information-message is recorded/received. A message log is viewable via the Dashboard.

The various embodiments described above are provided by way of illustration only and should not be construed to limit the invention. Those skilled in the art will readily recognize various modifications and changes that may be made to the claimed invention without following the example embodiments and applications illustrated and described herein, and without departing from the true spirit and scope of the claimed invention, which is set forth in the following claims.

What is claimed is:

1. A system for wearable buttons, comprising:
an independent wireless master button comprising electronics for a long range air interface for receiving executable instructions for according to a user changeable dashboard;
one or more slave buttons that are separate and independent from the master button, said slave buttons configured to communicate in short range wirelessly with the master button; and
a database of applications on a server containing the one or more executable instructions that are programable and reprogrammable using the dashboard so that each application is able to be associated with at least one of the master button and slave buttons by using the dashboard, to provide for user programmability of each of the master button and the slave buttons through the dashboard, and wherein the dashboard is accessible online separately from the master button and slave buttons;
wherein the database further comprises one or more available server app tables with records that the user may assign one or more of their buttons for the programmability, with fields that comprise a sever app ID, an app type field, an app description field, and object code for executing the app on the master button;
wherein the master and slave buttons are configured such that when the user presses the one or more slave buttons or the master button then the master button is configured to send a signal through the long range air-interface to the dashboard on the server to indicate that the one or more slave buttons or the master button has been pressed for execution of the applications programmed for the button the user pressed, the master button configured with electronics for both receiving and transmitting signals to and from the server for all of the slave buttons within short range wireless communication;
wherein the one or more executable instructions are configured to execute on a processor of the master button according to a user's actuation of the master button or the slave button according to the changeable dashboard.

2. The system of claim 1, wherein the one or more executable instructions are configurable on the dashboard.

3. The system of claim 2, wherein the dashboard is on a server and is configurable over a network.

4. The system of claim 3, wherein the network comprises the internet.

5. The system of claim 1, further comprising a headset device in communication with the master button.

6. The system of claim 5, wherein the executable instructions are further configured to provide messaging between two or more users each having wearable master and slave buttons.

7. The system of claim 6, wherein the dashboard is further for configuring which users are configured for messaging according to actuation of the master button and one or more slave buttons.

8. The system of claim 7, wherein the executable instructions are configured to light the master and slave buttons according to receiving audio messages from at least one of the two or more users.

9. The system of claim 8, wherein the dashboard is configured for configuring the one or more of the master and slave buttons to record and send audio messages to at least one of the two or more users.

10. A method for operating wearable buttons, comprising:
with an independent wireless master button comprising electronics for a long range air interface, receiving executable instructions for according to a user changeable dashboard;
with one or more slave buttons that are separate and independent from the master button, said slave buttons, communicating wirelessly with the master button; and
storing a database of applications containing the one or more executable instructions that are programable and reprogrammable using the dashboard so that each application is able to be associated with at least one of the master button and slave buttons by using the dashboard, to provide for user programmability of each of the master button and the slave buttons through the dashboard, and wherein the dashboard is accessible online separately from the master button and slave buttons;

wherein the database further comprises one or more available server app tables with records that the user may assign one or more of their buttons for the programmability, with fields that comprise a sever app ID, an app type field, an app description field, and object code for executing the app on the master button;

wherein the master and slave buttons are configured such that when the user presses the one or more slave buttons or the master button then the master button is configured to send a signal through the air-interface to the dashboard on the server to indicate that the one or more slave buttons or the master button has been pressed for execution of the applications programmed for the button the user pressed, the master button configured with electronics for both receiving and transmitting signals to and from the server for all of the slave buttons within short range wireless communication; and executing the one or more executable instructions on a processor of the master button according to a user's actuation of the master button or the slave button according to the changeable dashboard.

11. The method of claim 10, configuring the one or more executable instructions on the dashboard.

12. The method of claim 11, wherein the dashboard is on a server and is configured over a network.

13. The method of claim 12, wherein the network comprises the internet.

14. The method of claim 10, further comprising, with a headset device, communicating with the master button.

15. The method of claim 14, further comprising configuring the executable instructions to provide messaging between two or more users each having wearable master and slave buttons.

16. The method of claim 15, further configuring the dashboard to determine which users are configured for messaging according to actuation of the master button and one or more slave buttons.

17. The method of claim 16, wherein the executable instructions are configured to light the master and slave buttons according to receiving audio messages from at least one of the two or more users.

18. The method of claim 17, further comprising, with the dashboard, configuring the one or more of the master and slave buttons to record and send audio messages to at least one of the two or more users.

* * * * *